(12) United States Patent
Hong et al.

(10) Patent No.: US 9,682,363 B2
(45) Date of Patent: Jun. 20, 2017

(54) METHOD FOR PRODUCTION OF ACTIVATED CARBON

(71) Applicant: Preferred Utilities Manufacturing Corporation, Danbury, CT (US)

(72) Inventors: Jianhui Hong, Buffalo Grove, IL (US); Charles A. White, Danbury, CT (US); Dan Wallace, Bethel, CT (US); Peter Lavelle, Danbury, CT (US); Darrel Scribner, East Haven, CT (US)

(73) Assignee: Preferred Utilities Manufacturing Corporation, Danbury, CT (US)

( * ) Notice: Subject to any disclaimer, the term of this patent is extended or adjusted under 35 U.S.C. 154(b) by 0 days.

(21) Appl. No.: 14/936,766

(22) Filed: Nov. 10, 2015

(65) Prior Publication Data

US 2017/0128911 A1    May 11, 2017

(51) Int. Cl.
  *C01B 31/10* (2006.01)
  *B01J 20/30* (2006.01)
  *B01J 20/20* (2006.01)

(52) U.S. Cl.
  CPC ........... *B01J 20/3078* (2013.01); *B01J 20/20* (2013.01); *C01B 31/10* (2013.01)

(58) Field of Classification Search
  CPC ..................................................... C01B 31/10
  See application file for complete search history.

(56) References Cited

U.S. PATENT DOCUMENTS 7,981,835 B2 * 7/2011 Srinivasachar .......... B01J 20/20
                                                          423/460

* cited by examiner

*Primary Examiner* — Stuart Hendrickson
(74) *Attorney, Agent, or Firm* — Jianhui Hong

(57) ABSTRACT

A method for producing an activated carbon material comprises the steps of producing a hot flue gas stream from a combustion process in a first reactor; routing a first part of said flue gas stream to a second reactor that is substantially vertical; routing a second part of said flue gas stream to eventual venting; injecting and suspending a carbonaceous starting material into said second reactor to devolatilize and activate the carbonaceous starting material to produce an activated carbon material; separating the activated carbon material in a separating device; and routing the gas stream from said separating step to the first reactor for incineration of the volatile contents released from said injecting and suspending step. The activated carbon material is suited for the removal of vapor phase air toxics, such as mercury, from the flue gas of a coal fired power plant. An apparatus for producing the activated carbon material for the same purpose is also described.

10 Claims, 4 Drawing Sheets

METHOD FOR PRODUCTION OF ACTIVATED CARBON

BACKGROUND OF THE INVENTION

1. Field of the Invention

This invention relates generally to the on-site production of activated carbon material used for removal of vapor phase contaminants from a gas stream. More particularly, this invention relates to the production of activated carbon material for the removal of trace amounts of vapor phase air toxics, such as mercury, from the flue gas of a combustion process, especially from a coal-fired power plant.

2. Description of the Related Art

The 1990 Clean Air Act Amendments, Title III, require major sources of air emissions to limit the discharge of certain chemical species. Certain of these chemical species are categorized as air toxics, and major sources are required to limit emissions to 10 tons per year for any given air toxin. Certain of these species may be present in the flue gas emitted from combustion processes. Therefore, cost-effective methods for controlling emissions of these species are of significant interest to the operators of these processes.

Air toxics and other species regulated by the 1990 Clean Air Act Amendments can be distributed in both the vapor phase and the solid phase in the flue gas from a combustion process. Typically, the air toxics that are concentrated in the solid phase or particulate matter can be effectively removed by the use of a particulate collection device, such as an electrostatic precipitator (ESP) or fabric filter (FF). Air toxics, such as mercury, that are present in the vapor phase are typically in very low concentrations, for example, parts per million, making removal difficult.

On Dec. 16, 2011, the Environmental Protection Agency (EPA) finalized the first ever national standards to reduce mercury and other toxic air pollution from coal and oil-fired power plants. The standards are called Mercury and Air Toxics Standards (MATS). EPA has subsequently released updates on MATS.

According to US EPA, there are about 1,400 coal and oil-fired electric generating units (EGUs) at 600 power plants covered by these standards. They emit harmful pollutants including mercury, non-mercury metallic toxics, acid gases, and organic air toxics including dioxin. Power plants are currently the dominant emitters of mercury (50 percent), acid gases (over 75 percent) and many toxic metals (20-60 percent) in the United States.

Activated Carbon Injection (ACI), ACI with Fabric Filter (FF), or ACI with Electrostatic Precipitators (ESP) are identified by EPA as existing control methods for mercury control. It is a relatively common practice for power plant operators to purchase the activated carbon from a third party supplier. The commercial activated carbon material is typically transported to and stored at the power plant before it is used in the ACI process. The overall costs of the ACI could be a significant burden for the power plant operators. The high costs are in part due to the lengthy processes used in making the AC material in an off-site facility, and are in part due to the transportation to the power plant.

The Electric Power Research Institute (EPRI) and the University of Illinois at Urbana-Champaign (UIUC) patented a technology (U.S. Pat. Nos. 6,451,094 and 6,558,454) that claims to significantly reduce the cost of activated carbon (AC) for controlling mercury from coal-fired power plants. The technology involves the in-situ production of AC at the power plant using the site coal and then direct injection of the freshly produced sorbent into the flue gas to capture mercury. The AC is injected upstream of a particulate control device, such as an existing ESP or baghouse.

U.S. Pat. No. 6,451,094 disclosed methods for removal of air toxics. It has three independent claims (Claims 1, 8 and 15). Claim 1 is by directly injecting and suspending a carbonaceous starting material, such as coal, into a gas stream with air toxics, where the starting material is transformed into activated carbon material, and collecting the activated carbon material that has absorbed the air toxics. The shortcoming of this method is that the process of transforming the starting material into the final activated carbon material also produce volatile organic compounds (VOC) and air toxics such as CO in the gas stream. This process has the potential to reduce mercury, but it produces VOC and CO, which are also regulated pollutants by EPA. Therefore this method has limited practical usage. Claim 8 is by injecting and suspending a carbonaceous starting material, such as coal, into a first gas stream to produce the activated carbon, mixing the first gas stream with a second gas stream with air toxics such as mercury to allow the AC from the first stream to absorb the air toxics in the second stream, and collecting the resulting AC. Again the transformation of the starting material to the activated carbon could produce VOC and CO, and these regulated pollutants are carried into the second stream. Claim 15 also does not address the issues of VOC and CO produced in the formation of starting material into the activated carbon.

U.S. Pat. No. 6,558,454 similarly disclosed methods for removal of air toxics. It has four independent claims (Claims 1, 5, 13 and 17). Claims 1, 5 and 13 are very similar to Claims 1, 8 and 15 of U.S. Pat. No. 6,451,094; while Claim 17 is similar to Claim 1 except the starting carbonaceous material is selected from a group consisting of organic liquids and organic gases. These methods all have similar disadvantages: it did not address the volatiles and CO produced in the process of de-volatilization and activation.

In practice, these methods disclosed in U.S. Pat. Nos. 6,451,094 and 6,558,454 could potentially rely on an existing thermal process (such as the primary boiler) to incinerate the VOC and CO in the flue gas, but such practice requires modification to existing equipment and controls, reduces the flexibility of the power plant operation due to the coupling of AC production system and the existing thermal process of power plant. It is often desirable to de-couple the system for producing the activated carbon from the existing system for power generation since a fully coupled AC production system is very difficult to operate considering issues arising from turndown. It is desirable for the production of activated carbon to be on-site and stand-alone at a power plant in order to use the existing coal supply, rather than in-situ production of activated carbon. On-site and stand-alone production allows the collection and storage of activated carbon for subsequent injection to the pollutant-laden gas stream for the removal of pollutants. In-situ production of activated carbon, which is the essence of U.S. Pat. Nos. 6,451,094 and 6,558,454, does not have such advantages. The in-situ production of activated carbon has to be on-site by definition, but on-site production does not necessarily have to be in-situ. This is an important distinction. A stand-alone activated carbon production system could be designed to fit on mobile trailer units and brought on-site for quick installation in a plug-and-play manner, replacing the commercially purchased activated carbon material in part or in the entirety, with minimal interruption/disturbance to the existing operation of the power plant. Such an activated carbon production system could be operated independent of the operation of the power plant.

In view of the foregoing, there exists a need for an improved method for on-site and stand-alone production of activated carbon for removing vapor phase contaminants from a gas stream.

SUMMARY OF THE INVENTION

It is a general object of the present invention to provide a method for the on-site and stand-alone production of activated carbon for the removal of vapor phase contaminants from a gas stream, without producing additional regulated air pollutants.

A more specific object of the present invention is to provide a method for on-site and stand-alone production of activated carbon for the removal of vapor phase air toxics, such as mercury, from the flue gas of a combustion process.

Another object of the invention is to provide a method as described above in which the source of carbonaceous starting material is relatively inexpensive and readily available on the job site, thereby avoiding the significant costs of pelletization, de-volatilization, activation, grinding and transportation associated with the production and use of commercially available activated carbon material.

These objects are achieved by a method for producing an activated carbon material, comprising the steps of producing a hot flue gas stream from a combustion process in a first reactor; routing a first part of said flue gas stream to a second reactor that is substantially vertical; routing a second part of said flue gas stream to eventual venting; injecting and suspending a carbonaceous starting material into said second reactor to devolatilize and activate the carbonaceous starting material to produce an activated carbon material; separating the activated carbon material in a separating device; and routing the gas stream from said separating step to the first reactor for incineration of the volatile contents released from said injecting and suspending step.

Additional objects and features of the invention will appear from the following description from which the preferred embodiments are set forth in detail in conjunction with the accompanying drawings.

BRIEF DESCRIPTION OF THE DRAWINGS

Identical reference numerals throughout the figures identify common elements.

DESCRIPTION OF THE PREFERRED EMBODIMENTS

Figure 1:
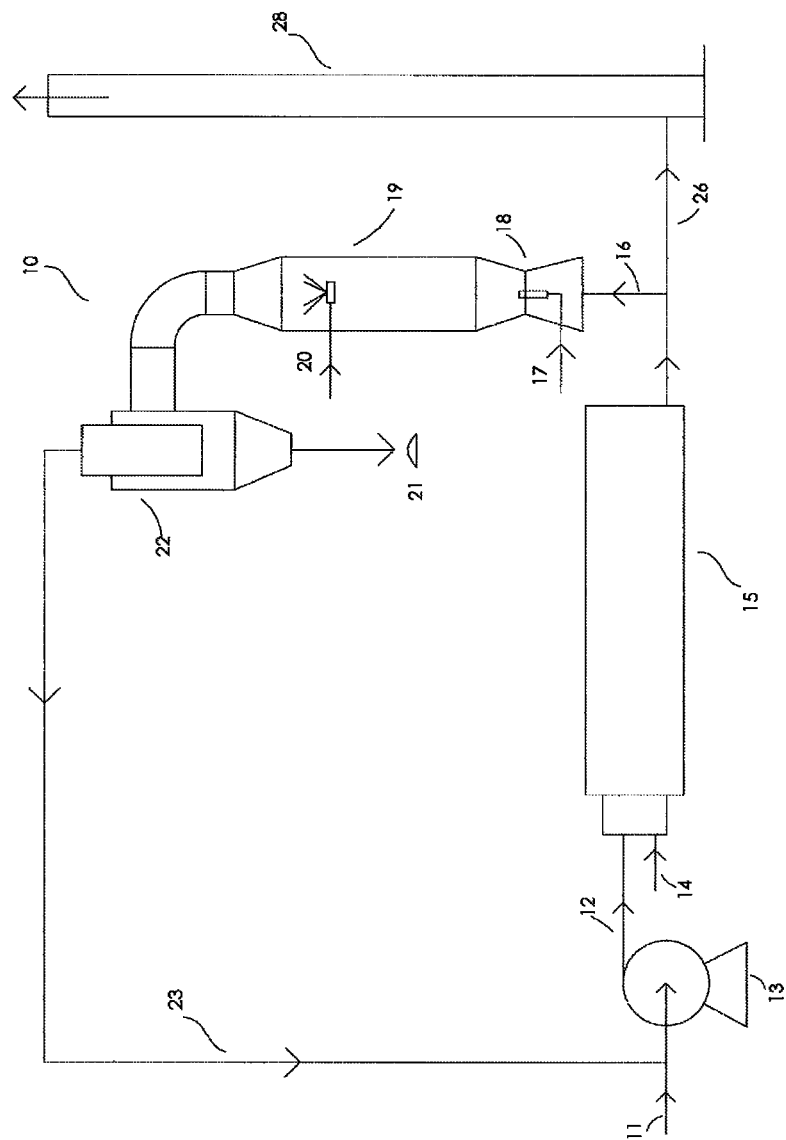
FIG. 1 is a schematic view of an apparatus for producing activated carbon from a carbonaceous starting material in accordance with the present invention.

FIG. 1 shows an activated carbon production system 10. A reactor 15 receives air through inlet duct 12 to combust fuel, such as natural gas, propane, biogas or fuel oil, received through fuel inlet duct 14. The combustion process within reactor 15 produces a flue gas stream. The reactor 15 is designed and operated with a sufficient residence time at elevated temperatures and incorporates the state-of the-art air pollutant control techniques such that the flue gas from reactor 15 meets local emission standards and can be vented to the atmosphere. The flue gas exiting reactor 15 preferably has relatively low oxygen contents, preferably at 3% oxygen on dry volume basis. This relatively low oxygen level in the flue gas has at least two advantages: first it improves the thermal efficiency of the activated carbon production system; secondly it creates an environment inducive to de-volatilization of the carbonaceous starting material rather than oxidation and combustion of the starting material. Oxidation of the carbonaceous starting material tends to reduce the yield of the activated carbon, and in some cases reduce the active surface area per unit mass. Part of the flue gas stream from 15 is directed through outlet duct 26 to eventual venting through stack 28, even though it could go through other optional devices such as a heat exchanger (see heat exchanger 27 shown in FIG. 3) to recover some heat before it is vented through stack 28. Another part of the flue gas stream from reactor 15 is directed through outlet duct 16 to reactor 19. Reactor 19 is substantially vertical so that the fluid flow is in a substantially vertical direction when the carbonaceous starting material is injected through injector 17. The substantially vertical direction of the fluid flow is advantageous since the fluid can carry and suspend the carbonaceous starting material. In comparison, injecting the carbonaceous starting material in a horizontal reactor may lead to drop out and accumulation of particulate matter at the bottom of the horizontal reactor, which is a notable operation nuisance and requires frequent shutdown and removal of the particulate matter. The particulate matter may also cause abrasion problems to the internal linings of the reactor. The abrasion is especially severe at the turning connector if the particulate matter and gas flow have to make a turn, for example from horizontal to vertical direction. Injecting the carbonaceous starting material into reactor 19 according to the present invention avoids the dropout and abrasion issues.

In the current invention, the carbonaceous starting material is injected into reactor 19 through injector 17, where it is devolatilized and activated to form the activated carbon material. Reactor 19 preferably incorporates a converging-diverging venturi section 18 at its lower part. The reduced area of the throat of the venturi section 18 serves to increase the fluid flow velocity, which tends to help establish a more uniform fluid velocity profile in reactor 19 and prevent a skewed flow with a recirculation zone in reactor 19. The increased fluid velocity through the throat of the venturi 18 also helps to entrain any particulate matter that drops down due to any non-ideal flow pattern.

The gas stream in reactor 19 downstream of the de-volatilization process is now contaminated with the volatiles released from the de-volatilization process and also CO (carbon monoxide) from partial oxidation of the volatiles due to the small amount of oxygen in the flue gas from reactor 15. A cooling fluid, such as water or steam or other suitable fluid, can be injected through injector 20 to cool down the temperature of the gas and the activated carbon material in reactor 19. The resulting stream is directed to a separating device 22, where the activated carbon 21 is separated out and collected for subsequent usage, and the remaining gas stream is directed through duct 23 to the inlet 11 of the air blower 13, and through duct 12 into reactor 15 to be incinerated. Therefore reactor 15 serves as both a flue gas generator and an incinerator.

Figure 2:
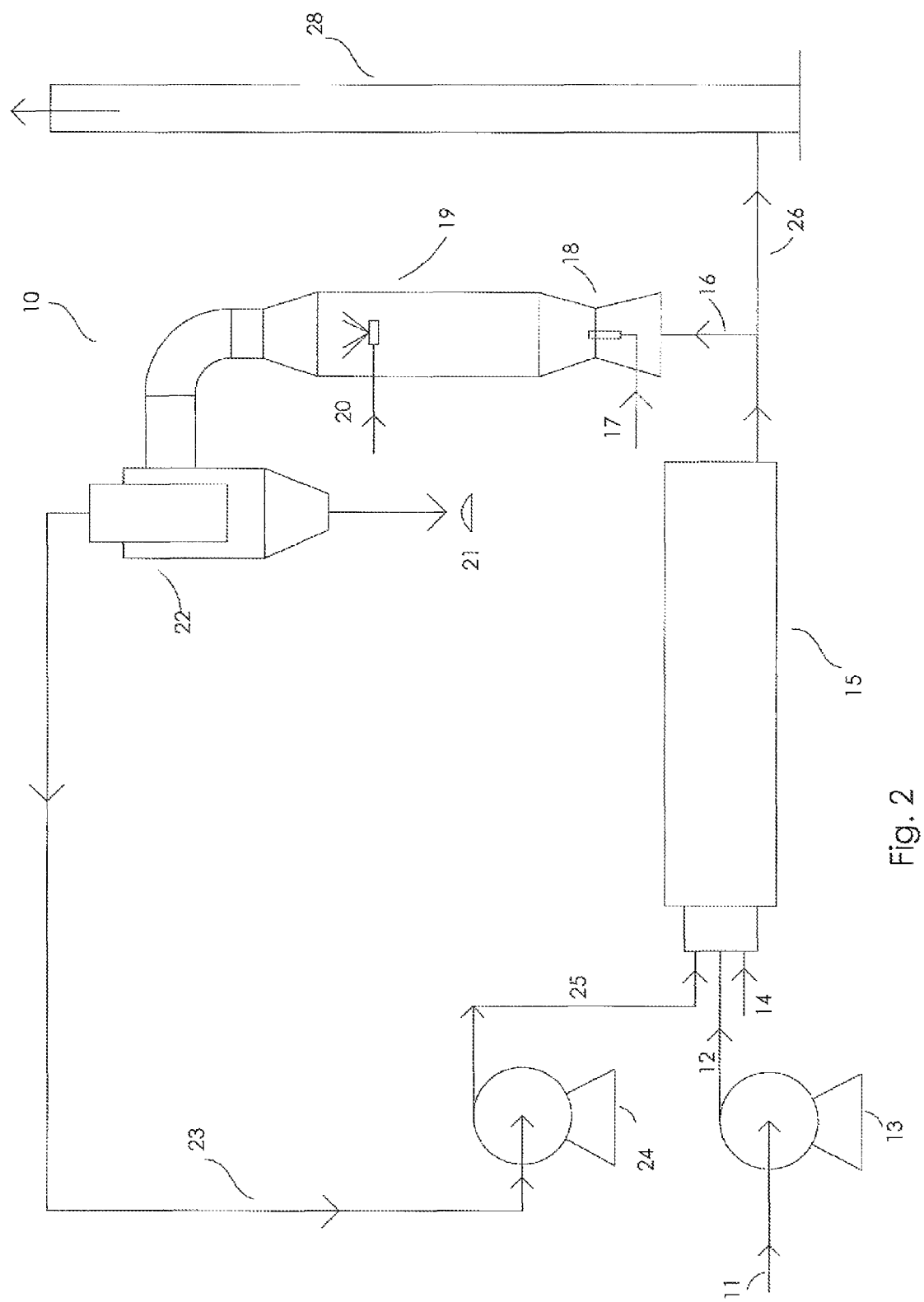
FIG. 2 is a schematic view of an alternative apparatus for producing activated carbon from a carbonaceous starting material in accordance with the present invention.

FIG. 2 shows an alternative embodiment of the activated carbon production system 10. A reactor 15 receives air through inlet duct 12 to combust fuel, such as natural gas, propane, biogas or fuel oil, received through fuel inlet duct 14. The combustion process within reactor 15 produces a flue gas stream. Part of the flue gas stream from reactor 15 is directed through outlet duct 26 to eventual venting through stack 28. Part of the flue gas stream from 15 is directed through outlet duct 16 to reactor 19. The carbonaceous starting material is injected into reactor 19 through injector 17, where it is devolatilized and activated to form the activated carbon. A cooling fluid can be injected through injector 20 to cool down the temperature of gas and the activated carbon material in reactor 19. The resulting stream is directed to a separating device 22, where the activated carbon 21 is separated and collected, and the remaining gas stream is directed through duct 23 to the inlet of flue gas blower 24, and then directed through duct 25 into reactor 15 to be incinerated. Therefore reactor 15 serves as both a flue gas generator and an incinerator.

Figure 3:
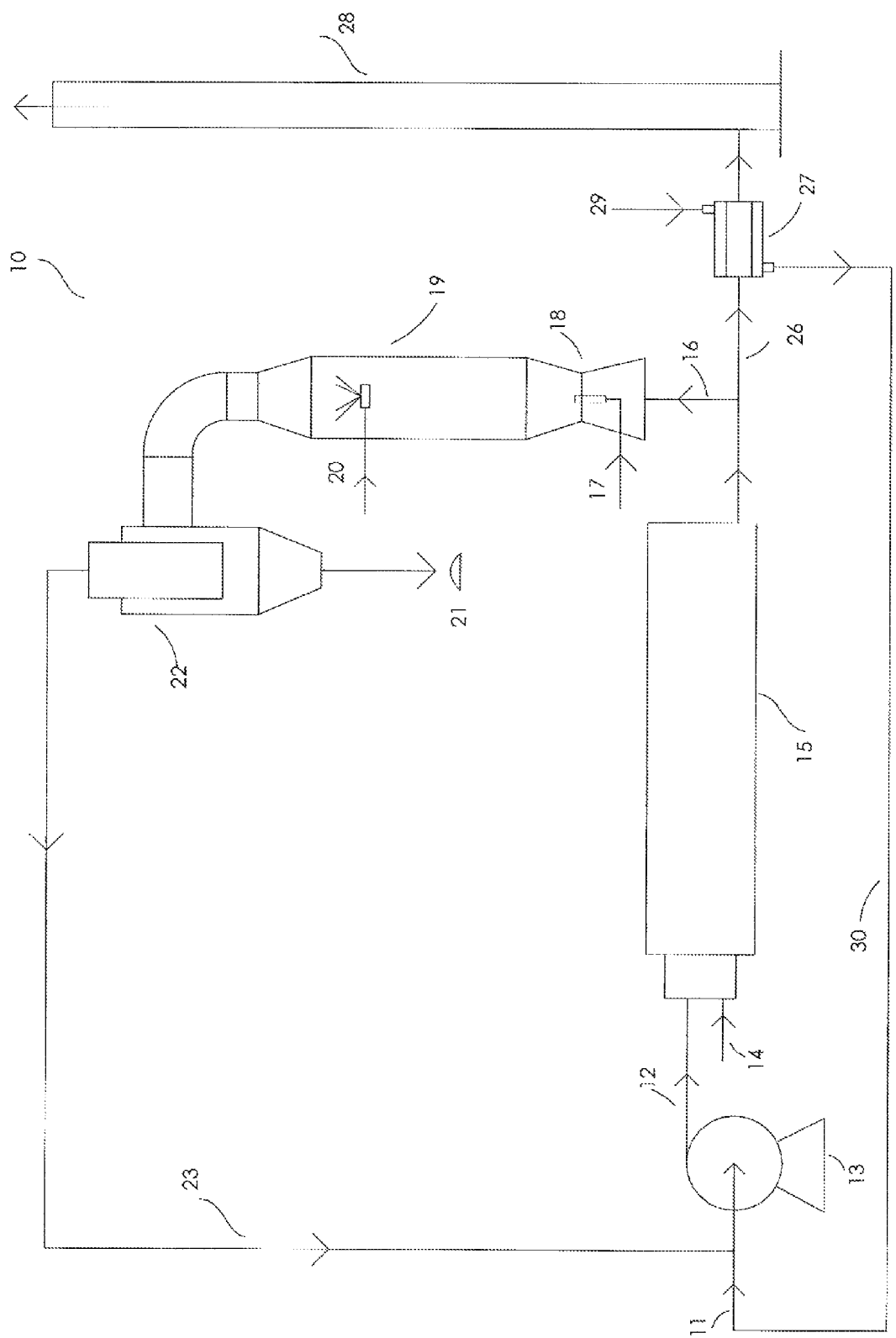
FIG. 3 is a schematic view of yet another alternative apparatus for producing activated carbon from a carbonaceous starting material in accordance with the present invention.

FIG. 3 shows yet another alternative embodiment of the activated carbon production system 10. This system works in a similar manner as in FIG. 1, except that it shows a heat exchanger 27 before stack 28. Part of the flue gas stream from 15 is directed through duct 16 to reactor 19. Another part of the flue gas stream from 15 is directed through outlet duct 26 to the heat exchanger 27, where a portion of the heat of the flue gas is recovered. Heat exchanger 27 could be a liquid/gas type like a heat exchanger used in a boiler where the cold side fluid is water, or gas/gas type where both the hot side and cold side fluids are gases. In one particular embodiment, reactor 15 is a refractory-lined thermal oxidizer, and heat exchanger 27 is a gas/gas type heat exchanger known as air preheater, with hot side fluid coming from duct 26, and cold side fluid being combustion air from duct 29. The preheated combustion air is then routed to duct 11 through a connecting duct between outlet duct 30 and duct 11.

Figure 4:
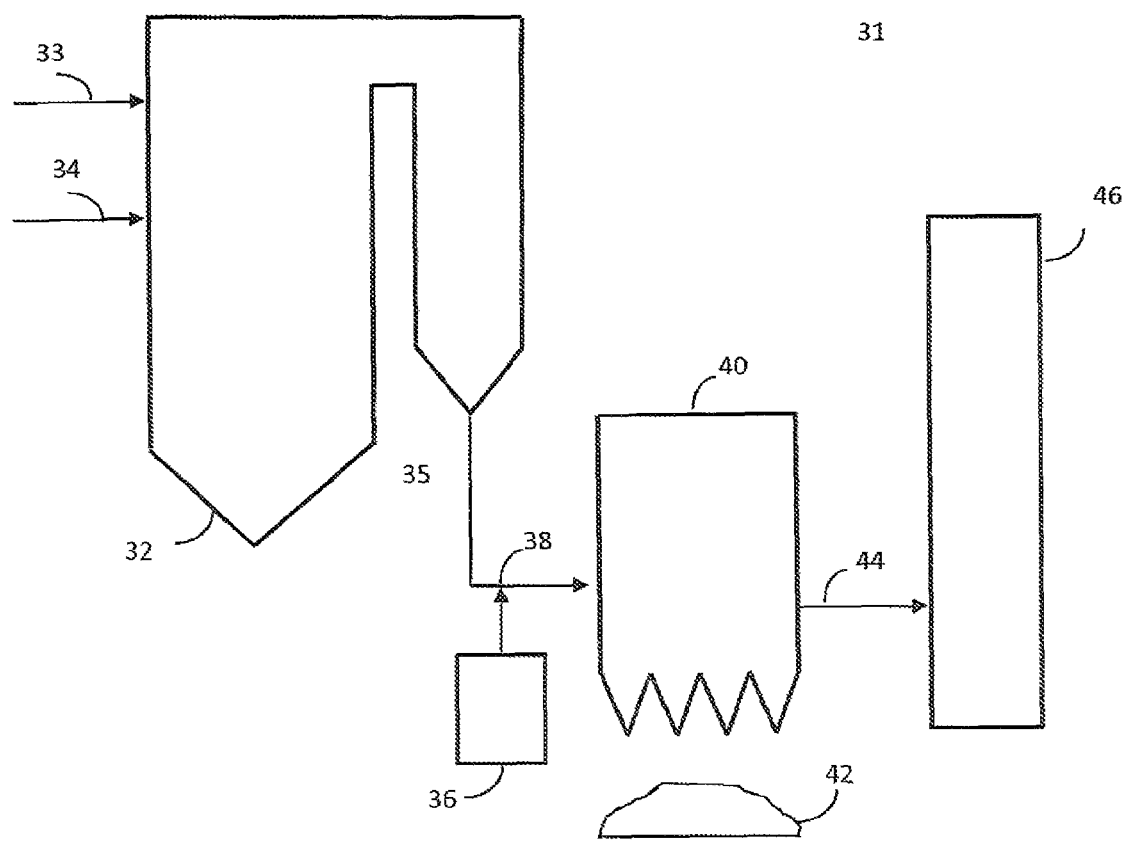
FIG. 4 is a schematic view of an apparatus for removing vapor phase contaminants from the flue gas of a combustion process using the activated carbon material produced from the current invention.

FIG. 4 shows a pollution removal system 31 for use with a combustion source, such as a fossil-fuel-fired boiler 32, which receives air through air inlet duct 33 to combust fuel, such as coal received through fuel inlet duct 34. The combustion process within boiler 32 produces a gas stream in boiler 32 in the form of flue gas which exits the boiler through outlet duct 35. The flue gas produced within the boiler is comprised of nitrogen, oxygen, products of combustion in the gaseous form such as water vapor, carbon dioxide, oxides of nitrogen and sulfur, halides, organic compounds, mercury, selenium and other trace metal vapors and particulate matter. Particulate collection device 40 is connected to outlet duct 35 and removes particulate matter 42 from the flue gas. The particulate collection device outlet duct 44 directs the flue gas to the stack 46 where it is discharged. An injector 36 and an injection location 38 are shown in FIG. 4. Injector 36 can be any mechanical or pneumatic device which feeds the activated carbon material produced according to one of FIGS. 1-3 into the flue gas stream at the desired injection location. FIG. 4 shows how the activated carbon material produced according to the current invention could be used to remove air toxics such as mercury in the flue gas produced from a combustion process.

Even though stack 28 in FIGS. 1-3 could be a different stack from stack 46 in FIG. 4, it should be appreciated that stack 28 could also be the same stack as stack 46, if it is advantageous to use an existing stack for venting of flue gas produced during the production of activated carbon material.

In operation and use, the method of the present invention comprises the steps of generating a gas stream in a first reactor, directing part of the gas stream from the first reactor to eventual venting, directing another part of the gas stream into a second reactor that is substantially vertical, injecting a carbonaceous starting material into the second reactor to remove the volatile contents from the starting material and to produce the activated carbon material, quenching the resulting stream in the second reactor with a cooling fluid, separating the activated carbon material in a separating device, collecting the activated carbon material for subsequent use, directing the gas stream from the separating step to the first reactor for incineration.

The carbonaceous starting material may be any carbonaceous material such as coal, wood, petroleum coke, biomass materials, sewage sludge, organic wastes or other carbonaceous material. The carbonaceous starting material can be injected in either a dry powdery form or as a wet slurry form, such that the heat of the gas stream in reactor 19 will evaporate at least some of the suspending fluid, leaving the carbonaceous starting material suspended in the gas stream.

The heat of the gas stream into which the carbonaceous starting material is injected then acts to heat the injected carbonaceous starting material, thereby producing the activated carbon. The gas stream must have an activation temperature, which is a gas stream temperature sufficient to remove the volatile contents of the carbonaceous starting material and to activate to some degree the carbonaceous starting material. A higher gas temperature is advantageous since it allows the de-volatilization and activation processes to occur in a shorter period of time. However if the gas temperature is too high, there is a risk of reaching the ash fusion temperature of the activated carbon material. The preferred activation temperature is between 600 and 2000 degree Fahrenheit.

In addition, the residence time, which is the amount of time that the carbonaceous starting material is present in the gas stream into which it is injected, will affect the degree of devolatilization and activation. A gas stream residence time of about 0.1 to about 10 seconds should be suitable to activate the carbonaceous starting material. Preferably the gas stream residence time is between about 0.3 and about 5 seconds, depending on gas temperature in reactor 19 upstream of the quenching process at injector 20. The injection of cooling fluid through injector 20 is also called the quenching step. It serves to reduce the temperature of the gas stream and the activated carbon material to avoid heat damage to the separating device 22 and allows separating device 22 to be constructed out of commonly available materials such as steel. If the gas temperature after the devolatilization/activation step is already low enough, the quenching step may be skipped.

The activated carbon material 21 can be stored for subsequent use or used immediately. They are now available to adsorb vapor phase contaminants contained in the flue gas, such as mercury. FIG. 4 shows how the activated carbon material are injected through injector 36 at location 38. The activated carbons containing adsorbed vapor phase contaminants is then removed from the gas stream by use of particulate collection device 40. This device may be a baghouse, electrostatic precipitator or other similar device which acts to remove particulate matter from a gas stream. The degree of removal of these vapor phase contaminants will be dependent upon the amount of activation achieved with any given carbonaceous starting material in reactor 19 and the amount of contact between the activated carbon material and the vapor phase contaminants.

As described above, the injection of a carbonaceous starting material into a first gas stream in reactor 19 at a suitable activation temperature and gas stream residence time will devolatilize and activate the carbonaceous starting material, thereby producing an activated carbon material. This activated carbon material is then available for adsorption of vapor phase contaminants in a second gas stream in duct 35 and can subsequently be removed from the second gas stream by use of particulate collection device 40. Therefore, the current invention allows the use of an inexpensive carbonaceous starting material which is de-volatilized and activated at the job site of the intended application (such as a coal fired power plant covered by MATS regulations), without the use of a commercially available but more expensive activated carbon material.

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, thereby enable others skilled in the art to best utilize the invention and various embodiments with various modifications as are suited to the particular use contemplated. It is intended that the scope of the invention be defined by the following claims and their equivalents.

What is claimed is:

1. A method of producing an activated carbon material, said method comprising the steps of:
   producing a hot flue gas stream from a combustion process in a first reactor;
   routing a first part of said flue gas stream to a second reactor that is substantially vertical;
   routing a second part of said flue gas stream to eventual venting;
   injecting and suspending a carbonaceous starting material into said second reactor to devolatilize and activate the carbonaceous starting material to produce an activated carbon material;
   separating the activated carbon material in a separating device; and
   routing the gas stream from said separating step to the first reactor for incineration of the volatile contents released from said injecting and suspending step.

2. The method as in claim 1 wherein said injecting step includes the step of injecting a carbonaceous starting material selected from the group consisting of coal, wood, petroleum coke, biomass materials, sewage sludge, and organic wastes.

3. The method as in claim 1 wherein said injecting step includes the step of injecting said carbonaceous starting material into said gas stream where said activation temperature of said gas stream is approximately 600-2000 degree Fahrenheit.

4. The method of claim 1 wherein said vapor phase contaminants comprise vapor phase mercury.

5. The method of claim 1 wherein said method further comprises the step of quenching the gas stream and activated carbon material with a cooling fluid before the separating step.

6. The method as in claim 5 wherein said injecting step includes the step of injecting said carbonaceous starting material into said gas stream at an injection location such that the injected material has a residence time between said injection location and the injection of cooling fluid of approximately 0.3-5 seconds.

7. The method of claim 1 wherein said method further comprises the step of routing the second part of the flue gas stream through a heat exchanger to cool down before it is routed to venting.

8. The method of claim 5 wherein said method further comprises the step of routing the second part of gas stream through a heat exchanger to cool down before it is routed to venting.

9. The method of claim 1 wherein said second reactor includes a converging-diverging venturi at the base of the reactor.

10. The method of claim 8 wherein said second reactor includes a converging-diverging venturi at the base of the reactor.

* * * * *